United States Patent
Miyairi et al.

(10) Patent No.: US 11,612,018 B2
(45) Date of Patent: Mar. 21, 2023

(54) HEATER, METHOD OF MANUFACTURING THE SAME, AND SYSTEM

(71) Applicants: NGK INSULATORS, LTD., Nagoya (JP); FAURECIA SYSTEMES D'ECHAPPEMENT, Nanterre (FR)

(72) Inventors: Yukio Miyairi, Nagoya (JP); Masaaki Masuda, Nagoya (JP); Xavier Bartolo, Nanterre (FR)

(73) Assignee: NGK Insulators, Ltd., Nagoya (JP)

( * ) Notice: Subject to any disclaimer, the term of this patent is extended or adjusted under 35 U.S.C. 154(b) by 504 days.

(21) Appl. No.: 16/658,658

(22) Filed: Oct. 21, 2019

(65) Prior Publication Data

US 2020/0128626 A1    Apr. 23, 2020

(30) Foreign Application Priority Data

Oct. 23, 2018    (JP) .............................. JP2018-199541

(51) Int. Cl.
   - *H05B 3/14* (2006.01)
   - *B28B 3/20* (2006.01)
   - *H05B 3/42* (2006.01)

(52) U.S. Cl.
   CPC .............. *H05B 3/141* (2013.01); *B28B 3/20* (2013.01); *H05B 3/42* (2013.01)

(58) Field of Classification Search
   CPC ........ F01N 3/2006; F01N 3/2026; F01N 3/28; H05B 3/141; H05B 3/42
   See application file for complete search history.

(56) References Cited

U.S. PATENT DOCUMENTS

| | | | |
|---|---|---|---|
| 6,397,588 B1 * | 6/2002 | Bruck ..................... | F01N 13/18 422/177 |
| 2005/0107244 A1 * | 5/2005 | Ichikawa ............... | B01D 53/94 428/116 |

(Continued)

FOREIGN PATENT DOCUMENTS

| EP | 0 452 125 A2 | 10/1991 |
|---|---|---|
| EP | 2 375 019 A2 | 10/2011 |

(Continued)

OTHER PUBLICATIONS

Extended European Search Report, European Application No. 19204899.9, dated Jan. 14, 2020 (8 pages).

(Continued)

*Primary Examiner* — Erin E McGrath
(74) *Attorney, Agent, or Firm* — Burr Patent Law, PLLC

(57) ABSTRACT

A heater may include: a conductive ceramic cylinder tube in which cell-arrays are concentrically arranged, each cell-array including cells which are arranged in a circumferential direction of the ceramic cylinder tube; an inner electrode electrically coupled to an inner wall portion of the ceramic cylinder tube; and an outer electrode electrically coupled to an outer wall portion of the ceramic cylinder tube. Non-linear portions are radially arranged in the ceramic cylinder tube, each non-linear portion extending in a radial direction of the ceramic cylinder tube while having a plurality of bends or curves between the inner wall portion and outer wall portion of the ceramic cylinder tube. The inner and outer electrodes are provided such that current flows radially at least via said non-linear portions between the inner and outer electrodes.

19 Claims, 13 Drawing Sheets

(56) References Cited

U.S. PATENT DOCUMENTS

| | | | |
|---|---|---|---|
| 2011/0250097 A1 | 10/2011 | Ido et al. | |
| 2011/0309068 A1* | 12/2011 | Chen | H05B 3/42 |
| | | | 219/548 |
| 2014/0010720 A1* | 1/2014 | Kasai | F01N 3/2803 |
| | | | 422/174 |
| 2016/0215667 A1* | 7/2016 | Omiya | F01N 3/2828 |
| 2018/0264456 A1 | 9/2018 | Takase | |
| 2018/0291787 A1 | 10/2018 | Bartolo | |

FOREIGN PATENT DOCUMENTS

| | | |
|---|---|---|
| EP | 2 375 020 A2 | 10/2011 |
| EP | 3 282 105 A1 | 2/2018 |
| JP | S63-067609 U | 5/1988 |
| JP | 2013-136966 A | 7/2013 |
| JP | 2018-153725 A | 10/2018 |
| JP | 2020-059443 A | 4/2020 |
| WO | 2016/163423 A1 | 10/2016 |

OTHER PUBLICATIONS

Japanese Office Action (with English translation), Japanese Application No. 2018-199541, dated May 31, 2022 (18 pages).

\* cited by examiner

[Fig. 1]
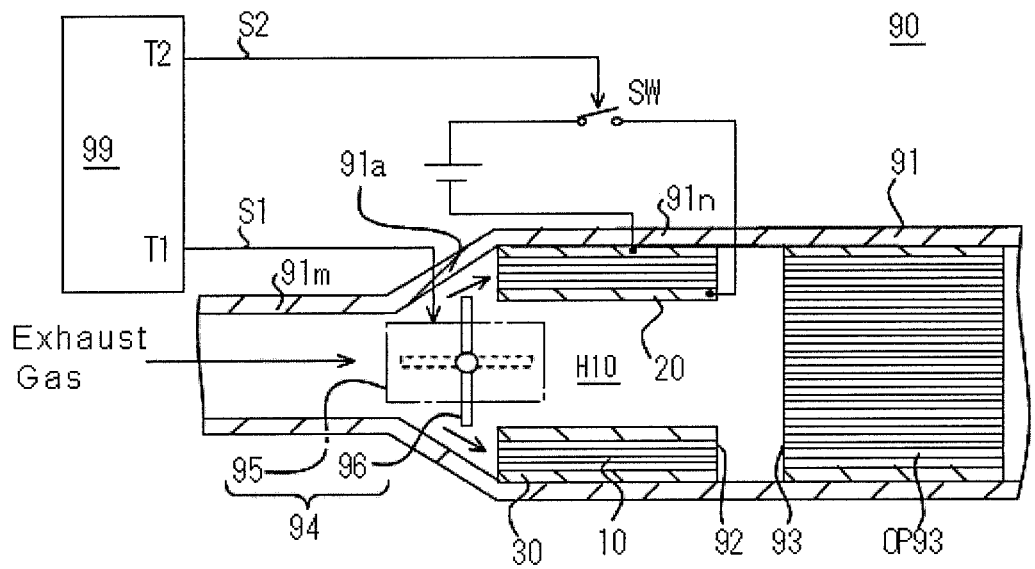
[Fig. 2]
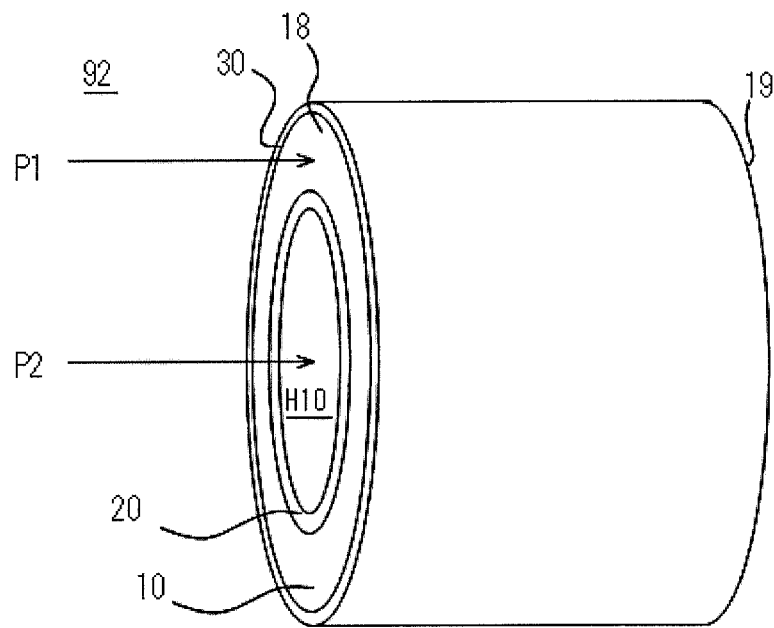

[Fig. 3]
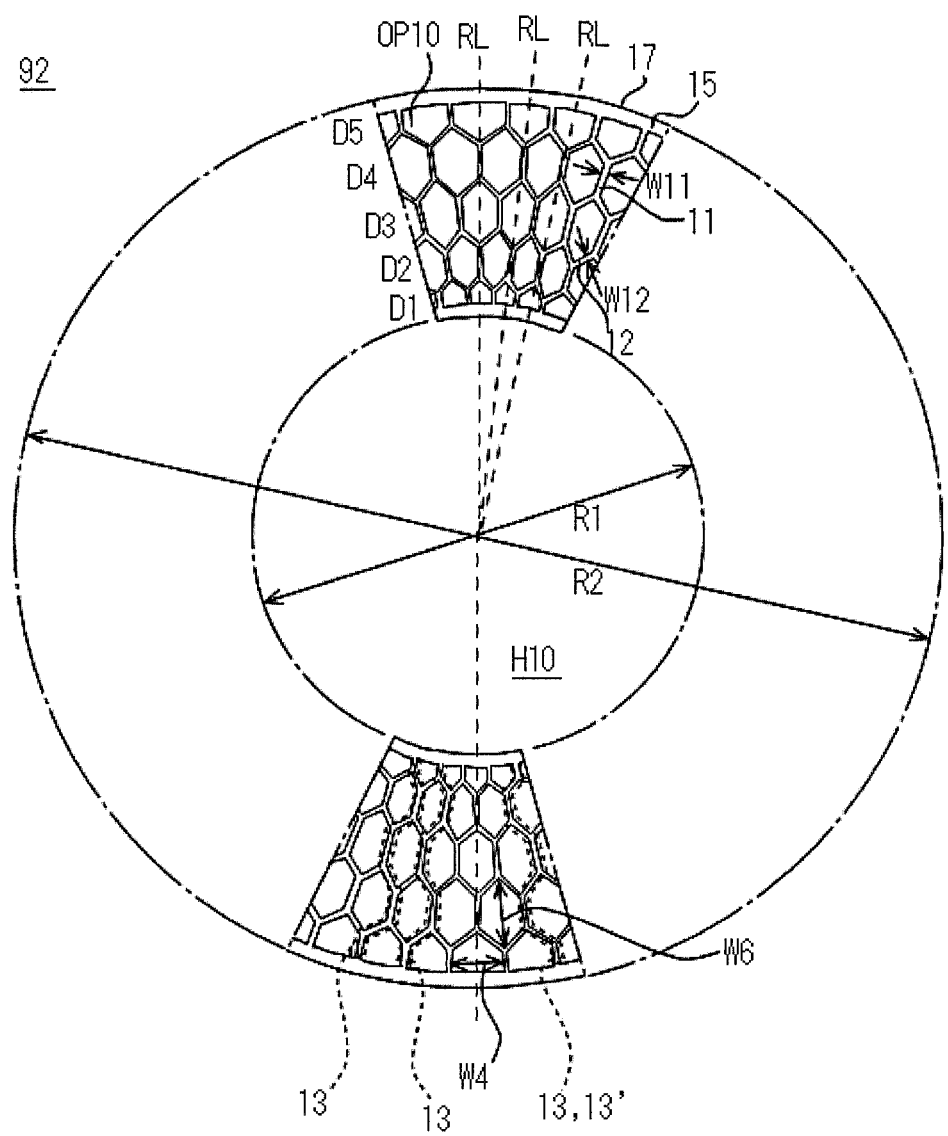

[Fig. 4]
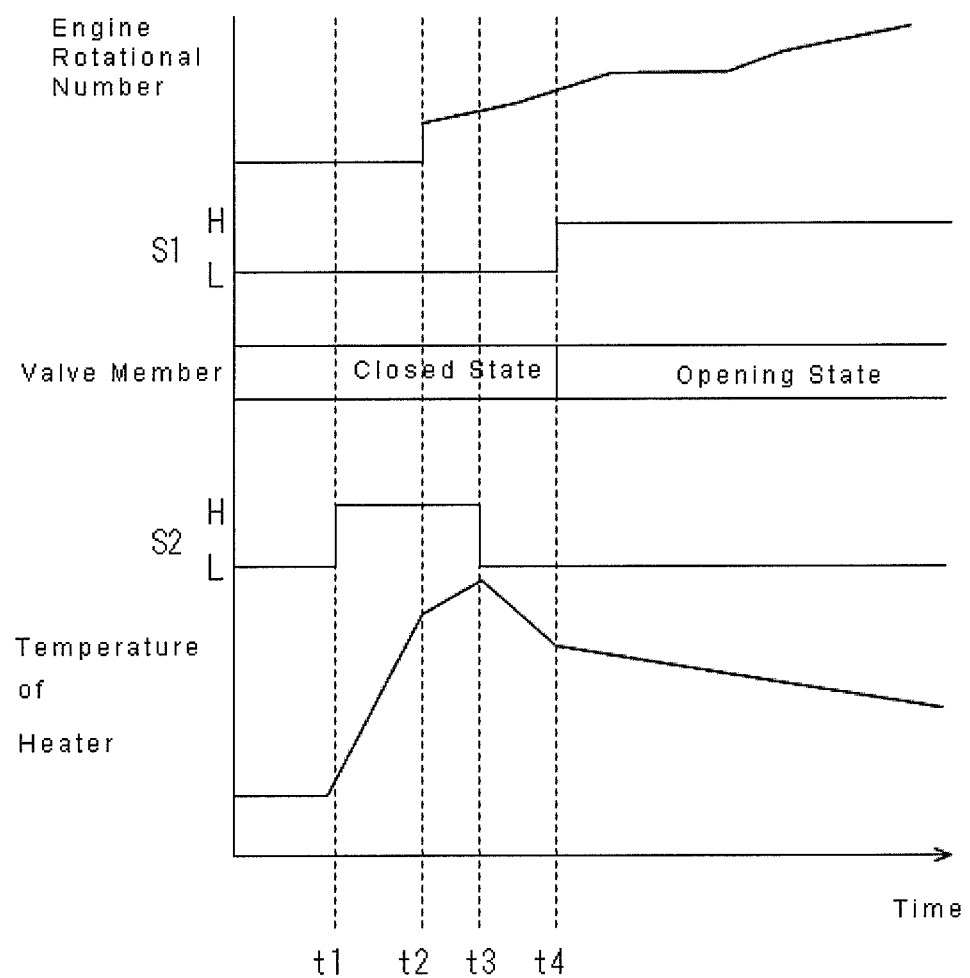

[Fig. 5]
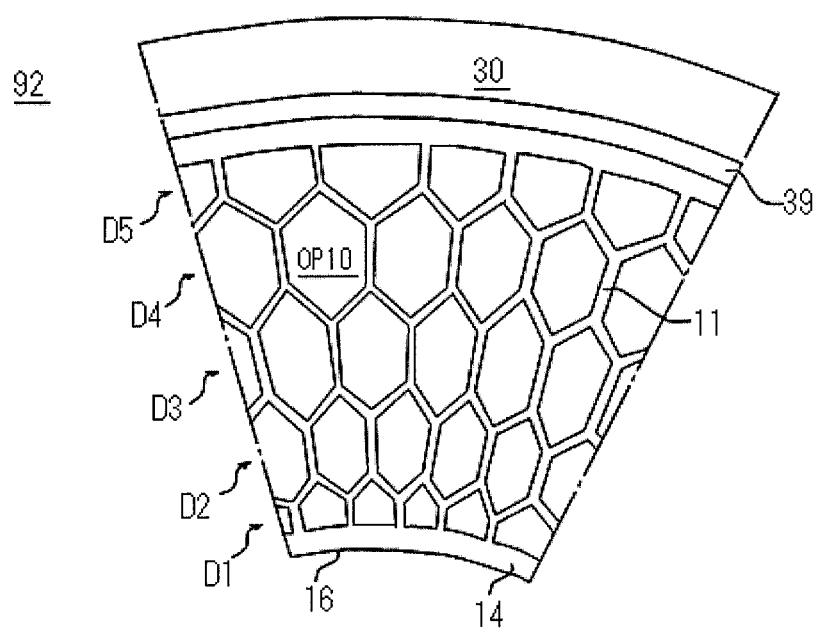

[Fig. 6]
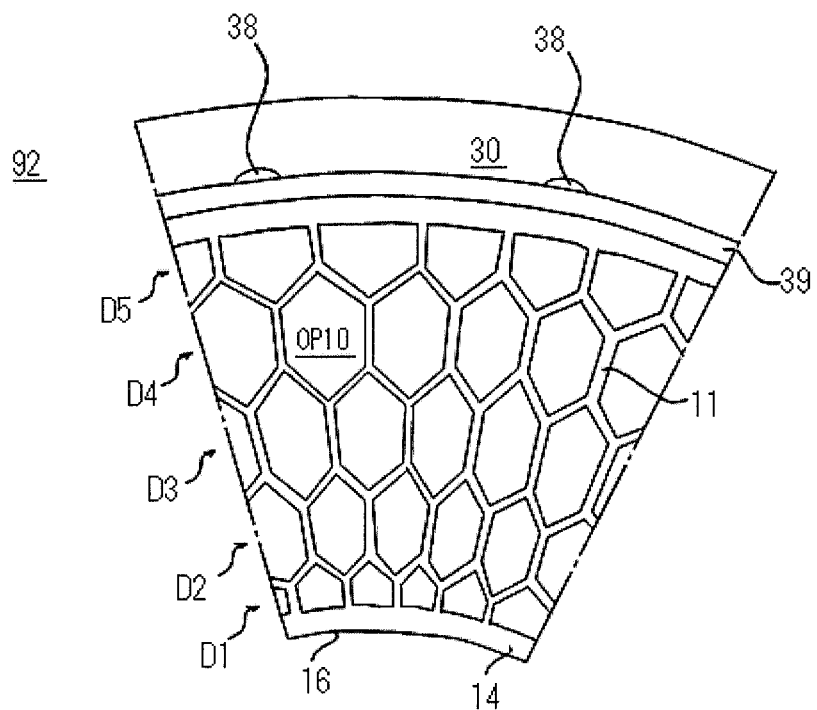

[Fig. 7]
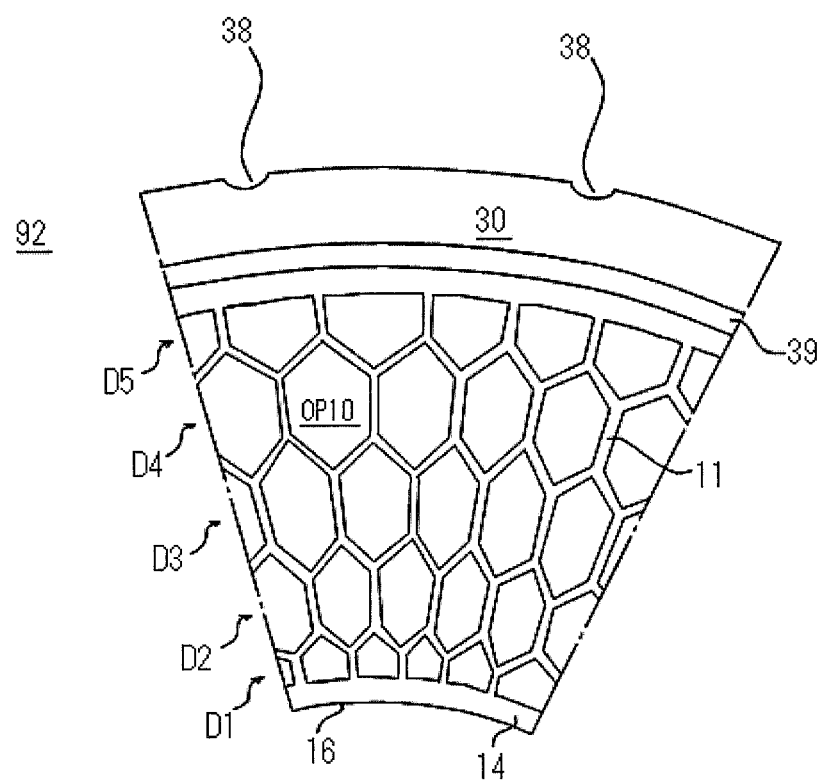

[Fig. 8]
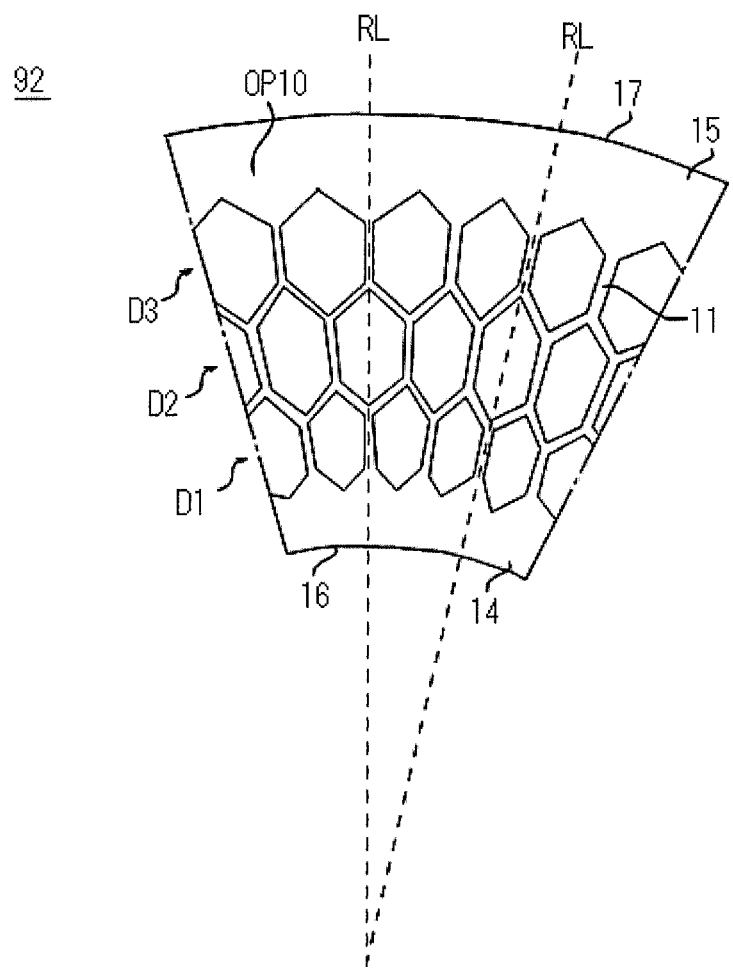

[Fig. 9]
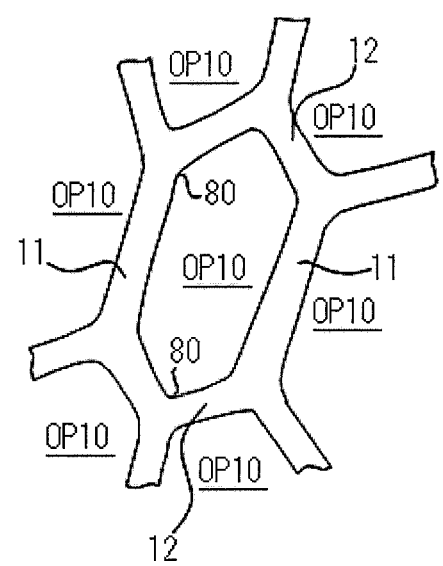

[Fig. 10]
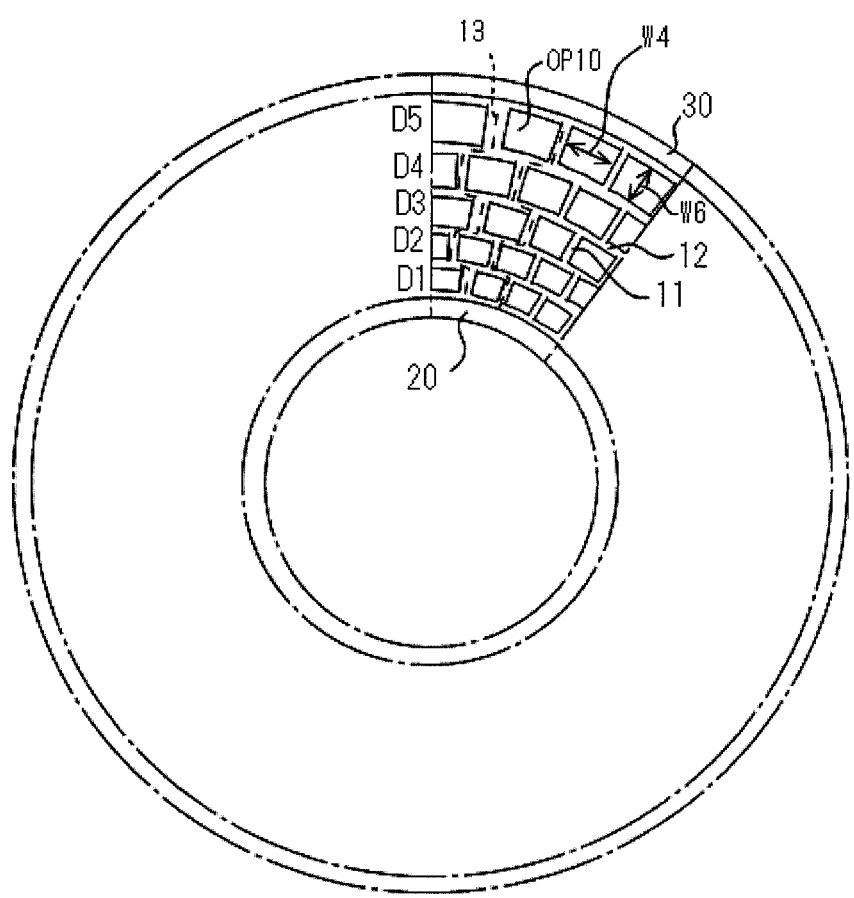

[Fig. 11]
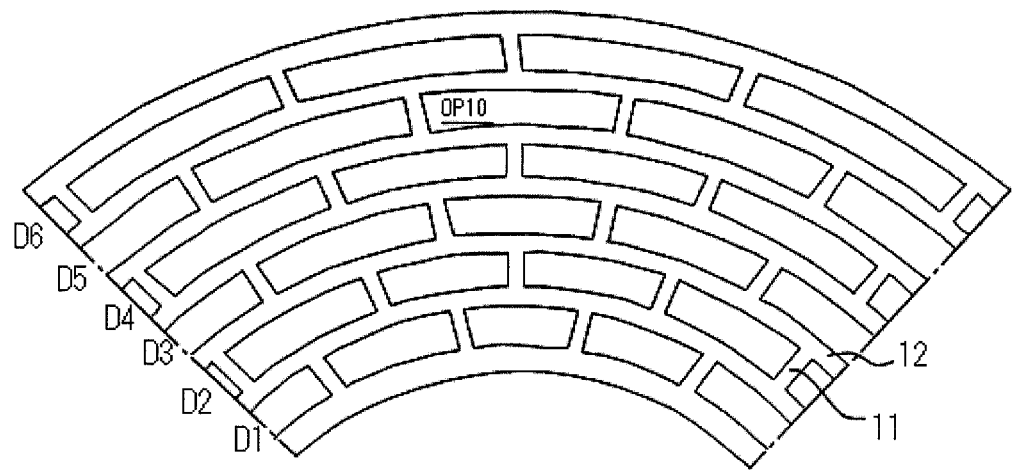
[Fig. 12]
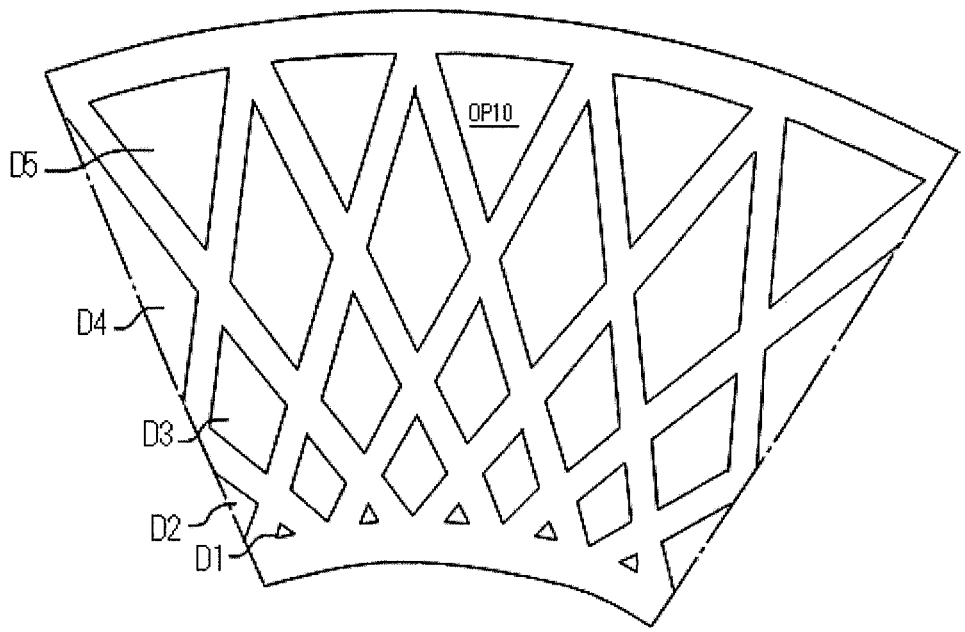

[Fig. 13]
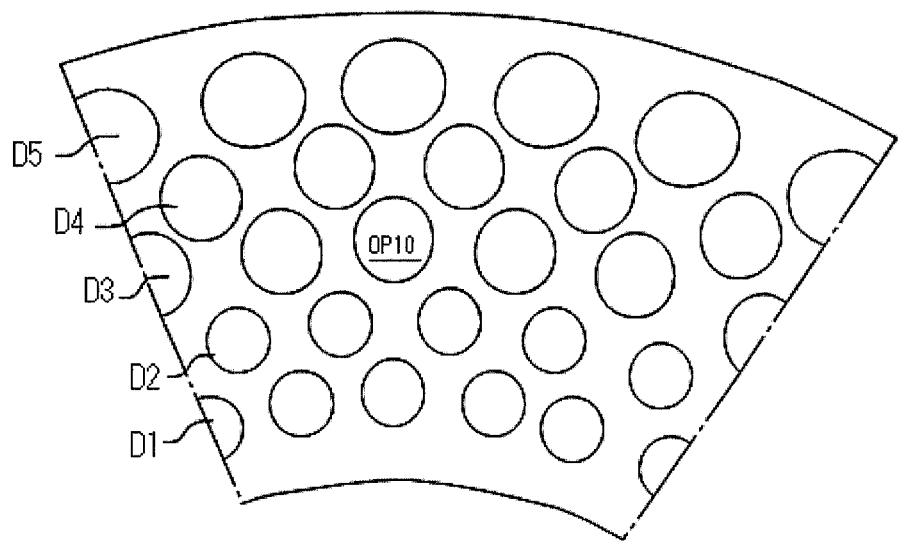
[Fig. 14]
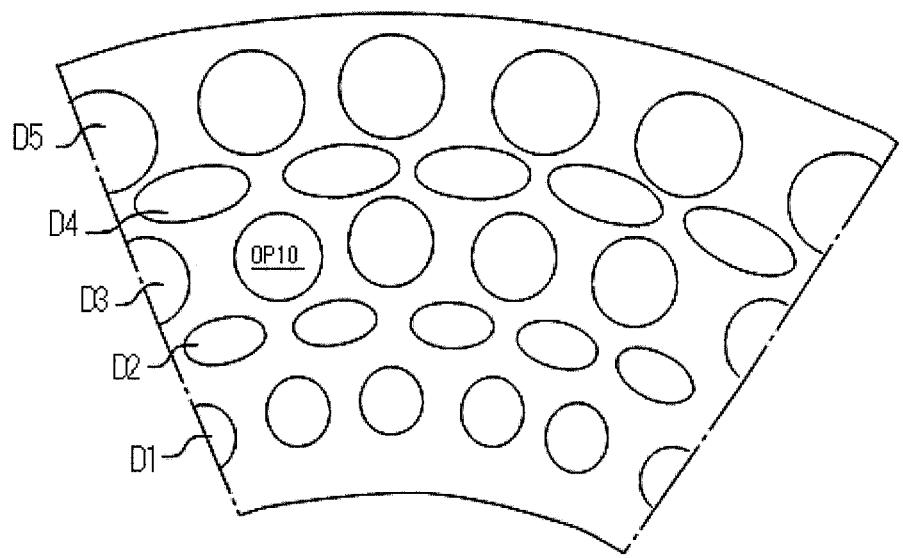

[Fig. 15]
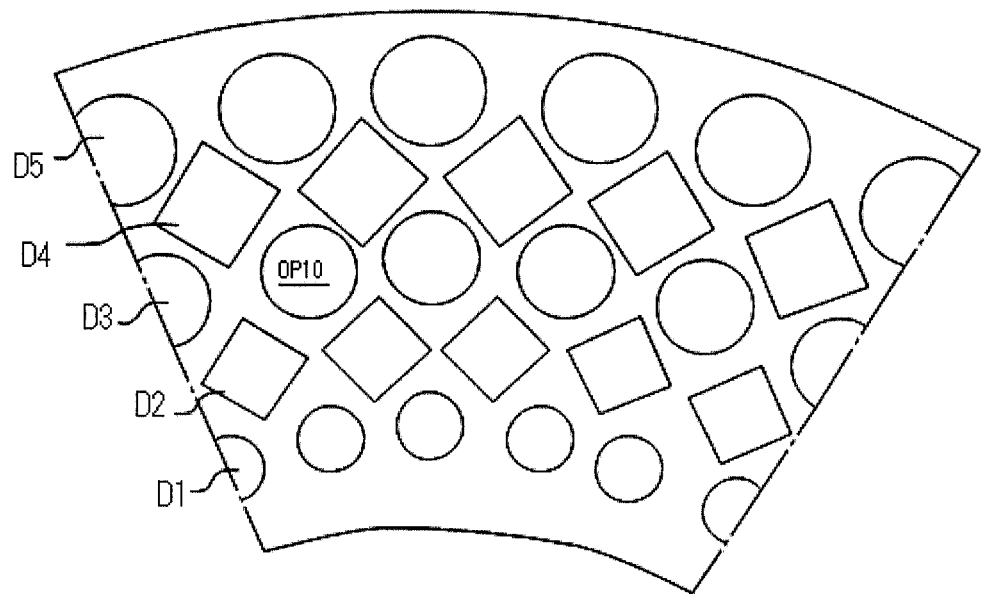
[Fig. 16]
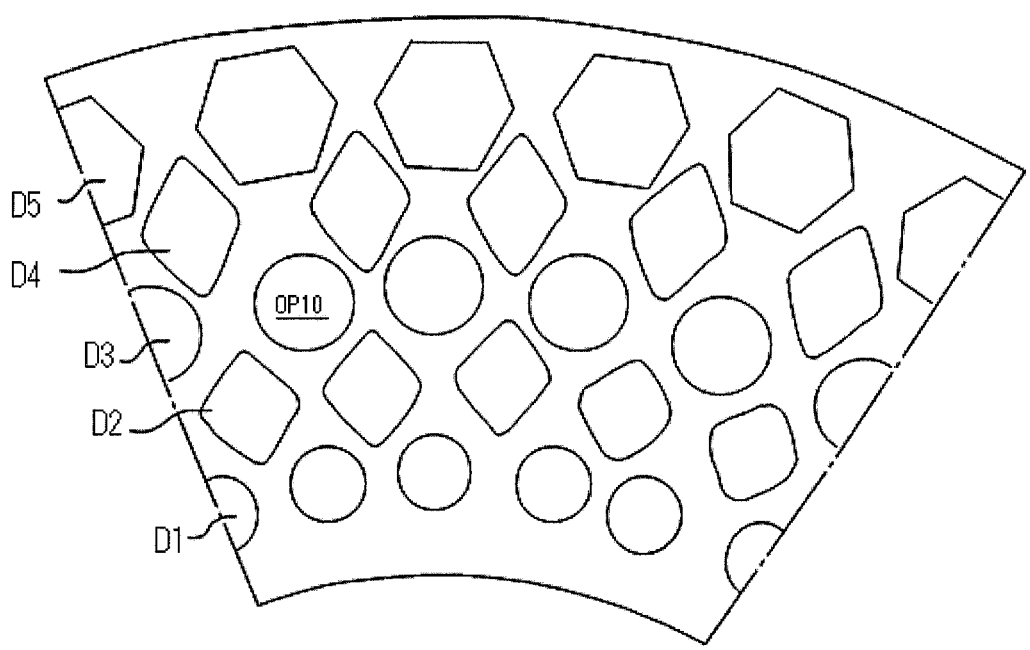

[Fig. 17]
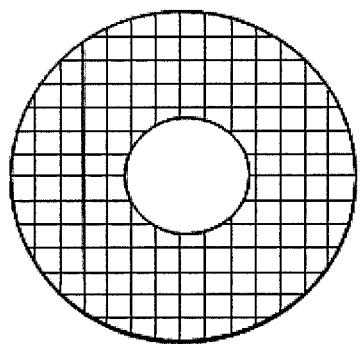
[Fig. 18]
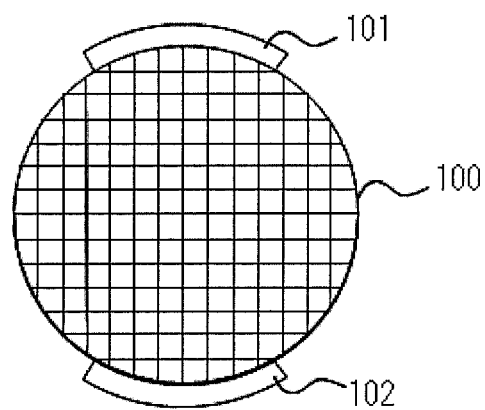

HEATER, METHOD OF MANUFACTURING THE SAME, AND SYSTEM

CROSS-REFERENCE TO RELATED APPLICATION

The present application claims a priority of Japanese Patent Application No. 2018-199541, filed on Oct. 23, 2018 and entitled "HEATER, METHOD OF MANUFACTURING THE SAME, AND SYSTEM", the entire content of which is hereby incorporated by reference.

TECHNICAL FIELD

The present disclosure is related to a heater, a method of manufacturing the same, and system.

BACKGROUND

International publication No. 2016/163423 discloses, as illustrated in its FIG. 1, a device that increases a temperature of a catalyst supported by a ceramic honeycomb structure 20A to its active temperature, by energizing and heating the ceramic honeycomb structure 20A between electrodes 12, 13 (See also para. 0032 of No. 2016/163423).

Japanese Utility Model Application Laid-open No. 63-67609 discloses a metal monolith catalyst device disposed upstream of a main monolith catalyst device made of ceramic. In the metal monolith catalyst device, one electrode is provided on its center axis, and an outer frame of the metal monolith catalyst device is used as the other electrode (See FIG. 4 of No. 63-67609). An amount of heat generated in a radially inward portion of the metal monolith catalyst device is greater than an amount of heat generated in a radially outward portion (See FIG. 4 of No. 63-67609). An amount of gas flowing into the radially inward portion of the metal monolith catalyst device is greater than an amount of gas flowing into the radially outward portion of the metal monolith catalyst device. Therefore, a temperature distribution in a traverse plane of the metal monolith catalyst device is equalized (See FIG. 6 of No. 63-67609).

SUMMARY

A heater according to an aspect of the present disclosure may include:
a conductive ceramic cylinder tube in which cell-arrays are concentrically arranged, each cell-array including cells which are arranged in a circumferential direction of the ceramic cylinder tube;
an inner electrode electrically coupled to an inner wall portion of the ceramic cylinder tube; and
an outer electrode electrically coupled to an outer wall portion of the ceramic cylinder tube, wherein
non-linear portions are radially arranged in the ceramic cylinder tube, each non-linear portion extending in a radial direction of the ceramic cylinder tube while having a plurality of bends or curves between the inner wall portion and outer wall portion of the ceramic cylinder tube, and
the inner and outer electrodes are provided such that current flows radially at least via said non-linear portions between the inner and outer electrodes.

In some embodiments, the non-linear portion may include a plurality of first cell-walls that extend in a radial direction of the ceramic cylinder tube, and the plurality of first cell-walls are arranged alternately between adjacent axial lines that extend in the radial direction of the ceramic cylinder tube.

In some embodiments, the non-linear portion may include a plurality of second cell-walls that extend so as to cross the axial line, and adjacent first cell-walls on the same axial line are coupled via one first cell-wall on an adjacent axial line and two second cell-walls.

In some embodiments, the cell may have a polygonal opening shape.

In some embodiments, a round surface may be formed at at least one or each corner of the cell.

In some embodiments, the number of bends or curves of the non-linear portion may be greater than the number of cell-arrays.

In some embodiments, the inner electrode and/or the outer electrode may be a tube-like electrode.

In some embodiments, the tube-like electrode may be formed across an entire region of an inner surface of the inner wall portion of the ceramic cylinder tube or may be formed across an entire region of an outer surface of the outer wall portion of the ceramic cylinder tube.

In some embodiments, the tube-like electrode may be provided with grooves that are arranged along a circumferential direction of the tube-like electrode.

In some embodiments, $0.3<(R1/R2)$ is satisfied, where R1 represents an inner diameter of the ceramic cylinder tube, and R2 represents an outer diameter of the ceramic cylinder tube.

In some embodiments, $0.6<(R1/R2)$ is satisfied, where R1 represents an inner diameter of the ceramic cylinder tube, and R2 represents an outer diameter of the ceramic cylinder tube.

A system according to an aspect of the present disclosure may include:
a flow passage in which an exhaust gas flows;
a heater of any one of above described heaters;
an exhaust gas purification device provided downstream of the heater in a flow direction of the exhaust gas in the flow passage;
a switching unit that switches between first and second flow channels, the first flow channel being provided by the cells of the ceramic cylinder tube included in the heater, and the second flow channel being provided by a tube hole that is surrounded by the cells of the ceramic cylinder tube.

A method of manufacturing a heater according to an aspect of the present disclosure may include:
producing, based on extrusion molding, a conductive ceramic cylinder tube in which cell-arrays are concentrically arranged, each cell-array including cells which are arranged in a circumferential direction of the ceramic cylinder tube;
fixing an inner electrode to the ceramic cylinder tube; and
fixing an outer electrode to the ceramic cylinder tube, wherein
non-linear portions are radially arranged in the ceramic cylinder tube, each non-linear portion extending in a radial direction of the ceramic cylinder tube while having a plurality of bends or curves between an inner wall portion and an outer wall portion of the ceramic cylinder tube, and
the inner and outer electrodes are provided such that current flows radially at least via said non-linear portions between the inner and outer electrodes.

In some embodiments, said fixing an inner electrode to the ceramic cylinder tube may include cooling or pressing the inner electrode to be fitted into the ceramic cylinder tube.

In some embodiments, said fixing an outer electrode to the ceramic cylinder tube comprises heating the outer electrode to be fitted to the ceramic cylinder tube.

In some embodiments, an intermediate layer is provided between the ceramic cylinder tube and the inner electrode.

In some embodiments, an intermediate layer is provided between the ceramic cylinder tube and the outer electrode.

According to an aspect of the present disclosure, it may be possible to provide a heater that is capable of generating sufficient amount of heat while suppressing that greater temperature gradient is caused at the time of energizing.

BRIEF DESCRIPTION OF DRAWINGS

FIG. 1 is a schematic view of a system according to an aspect of the present disclosure. FIG. 1 is a schematic view of a system capable of supplying exhaust gas to an exhaust gas purification apparatus via cells or tube hole of ceramic cylinder tube based on control of a valve member provided in a flow passage of exhaust gas.

FIG. 2 is a schematic perspective view of a heater according to an aspect of the present disclosure which is provided upstream of an exhaust gas purification apparatus in a flow passage of exhaust gas.

FIG. 3 is a schematic elevational view of a first end of a ceramic cylinder tube included in a heater according to an aspect of the present disclosure. In FIG. 3, inner diameter and outer diameter of the ceramic cylinder tube are indicated by arrows. In FIG. 3, illustration of cells in a region identified by a chain line is omitted.

FIG. 4 is a schematic timing chart showing operation of system according to an aspect of the present disclosure.

FIG. 5 is a schematic view illustrating an embodiment in which an intermediate layer is interposed between an outer electrode and a ceramic cylinder tube.

FIG. 6 is a schematic view illustrating an embodiment in which grooves extending along an axial direction of a ceramic cylinder tube are formed at an inner circumferential surface of an outer electrode.

FIG. 7 is a schematic view illustrating an embodiment in which grooves extending along an axial direction of a ceramic cylinder tube are formed at an outer circumferential surface of an outer electrode.

FIG. 8 is a schematic view showing an embodiment in which radially innermost cell array and radially outermost cell array in FIG. 3 are buried.

FIG. 9 is a schematic view showing an embodiment in which a round surface is provided at at least one corner of cell.

FIG. 10 is a schematic view showing an embodiment in which opening shape of cell is rectangular.

FIG. 11 is a schematic view showing a variation of opening shape and arrangement of cell.

FIG. 12 is a schematic view showing a variation of opening shape and arrangement of cell.

FIG. 13 is a schematic view showing a variation of opening shape and arrangement of cell.

FIG. 14 is a schematic view showing a variation of opening shape and arrangement of cell.

FIG. 15 is a schematic view showing a variation of opening shape and arrangement of cell.

FIG. 16 is a schematic view showing a variation of opening shape and arrangement of cell.

FIG. 17 is a schematic view showing cell arrangement according to a comparative example.

FIG. 18 is a schematic view showing cell arrangement and electrode arrangement according to a comparative example.

DETAILED DESCRIPTION

Hereinafter, non-limiting exemplary embodiments of the present invention will be described with references to FIGS. 1 to 18. Hereinafter, respective features described for a heater would be understood as individual features independent to other features, additionally to be understood as a combination with other features. Describing all of the combination of individual features would be redundant for a skilled person, and thus omitted. The individual features would be identified by language of "In some embodiments" or simply of "embodiment". The individual features would be understood as a universal feature that is effective not only to a heater disclosed in the drawings for example, but also effective to other various heaters.

FIG. 1 is a schematic view of a system 90 capable of supplying exhaust gas to an exhaust gas purification apparatus 93 via cells OP10 or tube hole H10 of ceramic cylinder tube 10 based on control of a valve member 96 provided in a flow passage 91 of exhaust gas. FIG. 2 is a schematic perspective view of a heater 92 which is provided upstream of an exhaust gas purification apparatus 93 in a flow passage 91 of exhaust gas. FIG. 3 is a schematic elevational view of a first end 18 of a ceramic cylinder tube 10 included in a heater 92. In FIG. 3, inner diameter R1 and outer diameter R2 of the ceramic cylinder tube 10 are indicated by arrows. In FIG. 3, illustration of cells OP10 in a region identified by a chain line is omitted. FIG. 4 is a schematic timing chart showing operation of system 90.

A system 90 may have a flow passage 91 in which exhaust gas flows, a heater 92 provided in the flow passage 91, and an exhaust gas purification apparatus 93 provided in the flow passage 91. The flow passage 91 may be a metal tube for example, and has a first tube 91m having a first inner diameter, a second tube 91n having a second inner diameter, and further a radially expanded portion 91a between the first tube 91m and the second tube 91n. In the radially expanded portion 91a, the inner diameter is gradually increased from the first tube 91m toward the second tube 91n. The heater 92 is provided downstream of the radially expanded portion 91a in the flow direction of exhaust gas in the flow passage 91. The exhaust gas purification apparatus 93 is provided downstream of the heater 92 in the flow direction of exhaust gas in the flow passage 91.

The system 90 further has a switching unit 94 and a controller 99. As would be well understood from the following descriptions, the switching unit 94 performs switching of flow passage of exhaust gas between a first flow passage P1 provided by cells OP10 of ceramic cylinder tube 10 included in the heater 92 and a second flow passage P2 provided by the tube hole H10 surrounded by cells OP10 of the ceramic cylinder tube 10. The switching unit 94 has a driver 95 and a valve member 96 driven by the driver 95. The valve member 96 may be provided in the flow passage 91, in particular provided adjacent to and upstream of the heater 92 in the flow direction of exhaust gas in the flow passage 91. The valve member 96 may be capable of taking a closed state in which the tube hole H10 of the ceramic cylinder tube 10 included in the heater 92 is closed and an opening state in which the tube hole H10 of the ceramic cylinder tube 10 is not closed. In some embodiments, the driver 95 may be a stepper motor, and the valve member 96 is a flat plate fixed to a motor axis of the motor. Any kind of shutter can be used for the switching unit 94. In other embodiments, the driver 95 may be driven by air pressure. ON/OFF of air-pressure-based valve allows opening and closing of a shutter e.g. butterfly valve. Preferably, used would be a shutter capable of opening and closing within a time period equal to or less than 1 second.

The controller 99 is capable of controlling an operational state of the switching unit 94. The controller 99 may transmit a control signal S1 to the driver 95 so as to control the state of the valve member 96 between the opening and closed states. The switching unit 94 may operate in accordance with the control signal S1 received from the controller 99. In an instance where the driver 95 of the switching unit 94 is a stepper motor, the motor axis rotates in accordance with a series of pulse signals of the control signal S1. When the rotational axis of motor rotates by 180 degree in response to the control signal S1, the state of the valve member 96 is switched between the closed and opening states. Note that, an embodiment is envisaged in which a position of valve member 96 is feedback-controlled by detecting a position of the valve member 96.

The exhaust gas flowing in the flow passage 91 may be blocked by the valve member 96 in the closed state from flowing into the second flow passage P2 i.e. the tube hole H10 of the ceramic cylinder tube 10. Under this state, the exhaust gas may flow into the first flow passage P1 of the ceramic cylinder tube 10, i.e. the cells OP10 of the ceramic cylinder tube 10. The exhaust gas which has flowed out of the first flow passage P1 (cells OP10) would flow into the exhaust gas purification apparatus 93 provided downstream of the heater 92.

Switching of the valve member 96 from the closed state to the opening state would result in shifting of the exhaust gas from flowing into the first flow passage P1 (cells OP10) to flowing into the second flow passage P2 (tube hole H10). The exhaust gas which has flowed out of the second flow passage P2 (tube hole H10) of the ceramic cylinder tube 10 would flow into the exhaust gas purification apparatus 93 provided downstream of the heater 92.

The exhaust gas would flow through the first flow passage P1 (cells OP10) when the valve member 96 is closed. The exhaust gas would flow through the second flow passage P2 (the tube hole H10) when the valve member 96 is open. Note that, it is envisaged that a part of exhaust gas may also flow through the second flow passage P2 (the tube hole H10) when the valve member 96 is closed, and a part of exhaust gas may also flow through the first flow passage P1 (cells OP10) when the valve member 96 is opened. It is also envisaged that, when the valve member 96 shifts between the closed and opening states, the exhaust gas flows into both of the first flow passage P1 and the second flow passage P2.

The controller 99 may be capable of controlling energization state of the heater 92, additionally to the control over the valve member 96. The controller 99 may transmit a control signal S2 to a switch SW so as to control the energization state of the heater 92 between ON-state and OFF-state. Note that, the controller 99 could possibly be configured by an analog circuit, digital circuit, analog-digital mixed circuit, microcomputer and any combination thereof. An embodiment is envisaged where separate controllers are used for controlling the energization of the heater 92 and for controlling the state of the valve member 96. The control signals S1, S2 may be a pulse signal, for example.

The heater 92 is provided upstream of the exhaust gas purification apparatus 93 in the flow direction of exhaust gas in the flow passage 91 so that the temperature of exhaust gas having reached the heater 92 (which is low) at a time of start of engine can be increased before being supplied to the exhaust gas purification apparatus 93. As a result, adequate purification of exhaust gas in the exhaust gas purification apparatus 93 would be facilitated. On the other hand, after a predetermined time period has been passed from a time of start of engine, the exhaust gas reaching the heater 92 would be high enough, and thus necessity of increasing the temperature of exhaust gas would be lowered. After the predetermined time period has passed from the time of start of engine, the valve member 96 may be controlled to take the opening state in which the tube hole H10 of the ceramic cylinder tube 10 is not closed, and the exhaust gas is supplied to the exhaust gas purification apparatus 93 via the tube hole H10 of the ceramic cylinder tube 10. Ability of purification of exhaust gas and suppression of back-pressure would be balanced.

Note that, the exhaust gas purification apparatus 93 may be a ceramic catalyst substrate that supports a catalyst, for example. Through chemical reaction via the catalyst in the exhaust gas purification apparatus 93, carbon monoxide (CO), nitrogen oxide (NOx), and hydrocarbon (HC) in the exhaust gas would be oxidized or reduced to carbon dioxide ($CO_2$), nitrogen ($N_2$), and water ($H_2O$). The catalyst substrate included in the exhaust gas purification apparatus 93 may be a column-like article in which cells OP93 (See FIG. 1) extending in the flow direction of exhaust gas are two-dimensionally arranged, and this may be referred to as a honeycomb structure. The catalyst substrate may include ceramic material such as cordierite ($2MgO.2Al_2O_3.5SiO_2$) or SiC, not necessarily limited to through. The catalyst supported by the catalyst substrate may be, by way of illustration, a ternary catalyst or oxidized catalyst, which supports a noble metal such as platinum (Pt), palladium (Pd), and rhodium (Rh) by a surface of fine pore of alumina and includes ceria, zirconia and so on as a promoter, or a NOx occlusion reduction catalyst which includes alkaline earth metal and platinum as occlusive components of nitrogen oxide (NOx). A catalyst not using a noble metal may include a NOx selective reduction catalyst that includes a copper-substituted or iron-substituted zeolite and so on, by way of example.

As illustrated in FIGS. 2 and 3, the heater 92 has a conductive ceramic cylinder tube 10, an inner electrode 20 electrically coupled to the inner wall portion 14 of the ceramic cylinder tube 10, and an outer electrode 30 electrically coupled to the outer wall portion 15 of the ceramic cylinder tube 10. It should be noted that the heater 92 is not limited to be used for heating exhaust gas, but the heater 92 could possibly be used for purifying exhaust gas. That is, an embodiment is envisaged in which cell-walls defining the cells OP10 of the ceramic cylinder tube 10 (e.g. first cell-walls 11 or second cell-walls 12 described below) support a catalyst. If the ability of heater 92 for purifying exhaust gas was high enough, then the exhaust gas purification apparatus 93 could possibly be omitted.

The ceramic cylinder tube 10 may be a porous body made of conductive ceramic material. The conductive ceramic material may be one or more material selected from a group consisting of SiC, Si-bonded SiC, and metallic Si impregnated Si—SiC. In some embodiments, the ceramic cylinder tube 10 may be produced based on extrusion molding. In an embodiment, the ceramic cylinder tube 10 is produced by firing a molded article obtained by extrusion molding of mixed clay of at least SiC powder, metallic Si powder, a dispersion medium (e.g. water) and an organic binder. The inner diameter R1 of the ceramic cylinder tube 10 is in the range of 40 to 350 mm, and the outer diameter R2 of the ceramic cylinder tube 10 is in the range of 50 to 400 mm. The inner electrode 20 and/or the outer electrode 30 may be a metal-made electrode such as copper, aluminum, and stainless steel. The thickness of the inner electrode 20 and/or the outer electrode 30 may be 0.5 to 20 mm.

The ceramic cylinder tube 10 may be a cylinder tube body extending in the axial direction, and has a first end 18 and a second end 19 opposite to the first end 18. The ceramic cylinder tube 10 is provided with a tube hole H10 that extend in the axial direction of the ceramic cylinder tube 10 and is opened at each of the first end 18 and the second end 19 of the ceramic cylinder tube 10. The tube hole H10 is a space positioned so as to be surrounded by the cells OP10, and is defined by the inner wall portion 14 of the ceramic cylinder tube 10. As described above, the cells OP10 provide the first flow passage P1 for exhaust gas. The tube hole H10 provides the second flow passage P2 for exhaust gas.

The ceramic cylinder tube 10 is provided with a plurality of cells OP10. The cell OP10 extends along the axial direction of the ceramic cylinder tube 10, and is opened at both ends of the first end 18 and the second end 19 that is opposite to the first end 18 of the ceramic cylinder tube 10. In other words, the cell OP10 has a first open end at the first end 18 of the ceramic cylinder tube 10, and a second open end at the second end 19 of the ceramic cylinder tube 10. Note that, when the heater 92 is provided in the flow passage 91, the cell OP10 extends along the flow direction of exhaust gas in the flow passage 91. The opening shape of the cell OP10 should not be limited to a polygon such as rectangle, pentagon, hexagon, but can take various shapes such as circle or oval. The average density of cells for the cells OP10 may be 30 to 140 cell/cm$^2$.

In the ceramic cylinder tube 10, concentrically arranged are cell arrays D1-D5 in each of which cells OP10 are arranged along the circumferential direction of the ceramic cylinder tube 10 (See FIG. 3). The number of cell arrays should not be limited to 5. In some embodiments, the number of cell arrays would be equal to or less than 20. In an instance in which the outer diameter R2 of the ceramic cylinder tube 10 is restricted by the inner diameter of the flow passage 91, increase in the number of cell-arrays may result in decrease of the inner diameter R1 of the ceramic cylinder tube 10 and, in turn, increase of back-pressure during the normal operating time period after the initial heating time period. The number of cells OP10 included in each cell array may be 50 to 250 cells, for example. The number of cells OP10 included in the cell array may be the same among different cell arrays.

The width W4 of each cell OP10 in the circumferential direction of the ceramic cylinder tube 10 is defined by a pair of first cell-walls 11 extending in the radial direction of the ceramic cylinder tube 10. The width W6 of each cell OP10 in the radial direction of the ceramic cylinder tube 10 is defined by a pair of second cell-walls 12 extending in the circumferential direction of the ceramic cylinder tube 10. The first cell-wall 11 extends linearly in the radial direction of the ceramic cylinder tube 10. The second cell-wall 12 extends linearly or in an arc or with one or more bends so as to cross the radial direction of the ceramic cylinder tube 10. In some embodiments, each thickness of the first cell-wall 11 and the second cell-wall 12 is within a range between 0.05 to 0.5 mm. Note that, the width W6 of radially innermost cell OP10 in the ceramic cylinder tube 10 may be defined by the inner wall portion 14 and the second cell-wall 12. Likewise, the width W6 of radially outermost cell OP10 in the ceramic cylinder tube 10 may be defined by the outer wall portion 15 and the second cell-wall 12.

In the embodiment illustrated in FIG. 3, the opening shape of cell OP10 is hexagon except for radially innermost cells OP10 of the ceramic cylinder tube 10 and radially outermost cells OP10 of the ceramic cylinder tube 10. Opening shape of the radially innermost cell OP10 of the ceramic cylinder tube 10 is pentagon, and opening shape of the radially outermost cell OP10 of the ceramic cylinder tube 10 is also pentagon. The second cell-wall 12 is bent at one point in accordance with the hexagonal opening shape of cell OP10.

In some embodiments, the inner wall portion 14 of the ceramic cylinder tube 10 is a coupled portion of radially innermost second cell-walls 12 of the ceramic cylinder tube 10 in a circumferential direction of the ceramic cylinder tube 10. Likewise, the outer wall portion 15 of the ceramic cylinder tube 10 is a coupled portion of radially outermost second cell-walls 12 of the ceramic cylinder tube 10 in a circumferential direction of the ceramic cylinder tube 10. Therefore, the radially innermost cell OP10 of the ceramic cylinder tube 10 may be defined by the pair of first cell-walls 11 and the pair of second cell-walls 12. The radially outermost cell OP10 of the ceramic cylinder tube 10 may be defined by the pair of first cell-walls 11 and the pair of second cell-walls 12.

Descriptions will be made for operation of system 90 with reference to FIG. 4. At time t1, the controller 99 outputs a control signal S2 of H level to turn ON the switch SW, and thus energizing of the ceramic cylinder tube 10 starts. Along with the start of energizing of the ceramic cylinder tube 10, the temperature of the ceramic cylinder tube 10 increases. Accordingly, the temperature of exhaust gas flowing through the first flow passage P1 of the ceramic cylinder tube 10, i.e. the cells OP10 can be increased. At time t2, an engine starts to operate. Along with the start of engine, an engine rotational number gradually increases. At the time of start of engine, the ceramic cylinder tube 10 has been at sufficiently high temperature. Therefore, the exhaust gas which has reached the heater 92 from the engine can be sufficiently heated by passing through the first flow passage P1 (cells OP10) of the heater 92. At time t3, the controller 99 switches the control signal S2 from H level to L level. Accordingly, the energizing of the ceramic cylinder tube 10 ends.

At time t4, the controller 99 outputs a control signal S1 of H level to set the valve member 96 into the opening state. The exhaust gas starts to flow into the second flow passage P2 (tube hole H10), alternatively to the first flow passage P1 (Cells OP10) in the heater 92. In particular, the exhaust gas is started to be supplied to the exhaust gas purification apparatus 93 via the tube hole H10 of the ceramic cylinder tube 10. At the time of start of engine, the valve member 96 takes the closed state, and thus back-pressure would be unfavorably increased. However, after a predetermined time period passes from the start of engine, the valve member 96 takes the opening state so that the back-pressure is reduced. The back-pressure is increased at the start of engine in return for increased temperature of exhaust gas, but this is only limited to the time when the engine starts to operate.

In some embodiments, time t3, t4 are timings synchronized to the start of engine. That is, the control signal S2 of L level (i.e. energizing termination instruction) and the control signal S1 of H level (i.e. flow passage switching instruction) are generated in synchronization with the start of engine. In some embodiments, the engine starts to operate in synchronization with the start of energizing of the ceramic cylinder tube 10 (the control signal S2 of H level). For example, after a predetermined time period has been passed from a time of start of energizing of the ceramic cylinder tube 10, the engine starts to operate. It should be noted that an embodiment is envisaged in which energizing of the ceramic cylinder tube 10 starts after the start of engine.

In some embodiments, the heater 92 is provided adjacent to and downstream of the radially expanded portion 91a of the flow passage 91 (See FIG. 1). Accordingly, when the valve member 96 is open, the exhaust gas is restricted from flowing into the cells OP10 of the ceramic cylinder tube 10. Note that, an embodiment is envisaged in which energizing of the ceramic cylinder tube 10 continues even after the valve member 96 is switched to the opening state.

In the present embodiment, as illustrated in FIG. 3, non-linear portions 13 are radially arranged in the ceramic cylinder tube 10, each non-linear portion 13 extending in the radial direction of the ceramic cylinder tube 10 while having a plurality of bends or curves between the inner wall portion 14 and the outer wall portion 15 of the ceramic cylinder tube 10. Moreover, the inner electrode 20 and the outer electrode 30 are provided such that current flows radially at least via said non-linear portions 13 between the inner electrode 20 and the outer electrode 30. The non-linear portion 13 provides a current path that extends while having a plurality of bends or curves between the inner electrode 20 and the outer electrode 30, thus facilitating generation of greater amount of heat. The inner electrode 20 and the outer electrode 30 allows generation of radial current paths in the ceramic cylinder tube 10. Accordingly, it would be facilitated that sufficient amount of heat would be obtained in the ceramic cylinder tube 10 while suppressing that greater temperature gradient is caused at the time of energizing of the ceramic cylinder tube 10.

The non-linear portion 13 extends while having a plurality of bends or curves, when it extends along the radial direction of the ceramic cylinder tube 10 from the outer wall portion 15 to the inner wall portion 14 or from the inner wall portion 14 to the outer wall portion 15. The manner of bends or curves of the non-linear portion 13 is in accordance with the opening shape of cell OP10, and should not be limited to a manner in which the non-linear portion 13 is bent at a predetermined angle. The number of bends in the non-linear portion 13 is greater than the number of cell arrays. In an embodiment illustrated in FIG. 3, the number of bends in the non-linear portion 13=8, and the number of cell arrays=5.

The non-linear portion 13 extends along the periphery of radially outermost cell OP10, and then extends along the periphery of radially inward adjacent cell OP10. The non-linear portion 13 repeats to extend along the peripheries of radially inward adjacent cells OP10. Finally, the non-linear portion 13 reaches the inner wall portion 14. The same holds true for an instance in which the non-linear portion 13 extends from radially inward side to radially outward side. In dependent to opening shape of cell OP10, the non-linear portion 13 may have a section (i.e. first cell-wall 11) in which it extends straight on the axial line RL extending in the radial direction of the ceramic cylinder tube 10, but not necessarily limited thereto.

The non-linear portion 13 includes a plurality of first cell-walls 11 each extending in the radial direction of the ceramic cylinder tube 10. The plurality of first cell-walls 11 are arranged alternately on the adjacent axial lines RL each extending in the radial direction of the ceramic cylinder tube 10. The non-linear portion 13 includes a plurality of second cell-walls 12 each extending so as to cross the axial line RL. Adjacent first cell-walls 11 on the same axial line RL is coupled via one first-cell wall 12 positioned on an adjacent axial line RL and two second cell-walls 12. In an embodiment in which the cell OP10 has a hexagonal opening shape, the first cell-walls 11 adjacent on the axial line RL are coupled via the first and second cell-walls 11, 12 that surrounds the same cell OP10. The first and second cell-walls 11,12 that surround the same cell OP10 stated in this paragraph include a radially inward second cell-wall 12, a first cell-wall 11 positioned on an adjacent axial line RL, and radially outward second cell-wall 12. In such a configuration, the length of the non-linear portion 13 would be longer between the inner wall portion 14 and the outer wall portion 15, facilitating generation of greater amount of heat. Note that, in an embodiment in which the cell OP10 has a hexagonal opening shape, the first cell-walls 11 adjacent in the axial line RL are coupled via two bends on the adjacent axial line RL.

The width W13 of the non-linear portion 13 is equal to the width W11 of the first cell-wall 11 and equal to the width W12 of the second cell-wall 12. In an instance in which the width W11 of the first cell-wall 11 and the width W12 of the second cell-wall 12 are equal, the width W13 of the non-linear portion 13 would be understood as constant. An embodiment is envisaged in which the width W11 of the first cell-wall 11, the width W12 of the second cell-wall 12, or the width W13 of the non-linear portion 13 changes from radially inward side to radially outward side of the ceramic cylinder tube 10. Theoretically, the constant width W13 of the non-linear portion 13 would facilitate that heat generated due to current flowing in the non-linear portion 13 is constant in the radial direction of the ceramic cylinder tube 10. In some embodiments, the width W13 of the non-linear portion 13 is in the range of 0.05 to 0.5 mm, or 0.05 to 0.2 mm. Note that, the upper limit of width W13 of the non-linear portion 13 could be restricted from a viewpoint of suppression of increase of back-pressure or conditions of manufacturing or other reasons.

Based on the radial arrangement of the non-linear portions 13 in the ceramic cylinder tube 10, the radial current paths in the ceramic cylinder tube 10 is generated. The radial current paths is formed between the inner electrode 20 and the outer electrode 30. In particular, current radially flows from the inner electrode 20 to the outer electrode 30 or current radially flows from the outer electrode 30 to the inner electrode 20. As illustrated in FIG. 3, the non-linear portion 13 may extend along the radial direction of the ceramic cylinder tube 10 as indicated by the reference numbers (13, 13'). Current may flow in all of the first cell-walls 11. Current may flow in all of the second cell-walls 12. Even provided that current does not flow in any of the second cell-walls 12, it could be heated by receiving heat transmitted from neighboring first or second cell-wall 11, 12.

The inner electrode 20 and the outer electrode 30 can take various shapes in so far as generation of radial current path can be facilitated. However, a tube-like electrode can be employed as the inner electrode 20 and/or the outer electrode 30 in order to enhance fixing strength of electrode against the ceramic cylinder tube 10 or to suppress failure in electrical connection between the ceramic cylinder tube 10 and the electrode. That is, in some embodiments, the inner electrode 20 and/or the outer electrode 30 may be a tube-like electrode.

When a tube-like electrode is used as the outer electrode 30, the electrode layer of the outer electrode 30 extends in the circumferential direction of the ceramic cylinder tube 10 to surround the ceramic cylinder tube 10. The electrode layer of the outer electrode 30 is provided radially outward relative to the outer wall portion 15 of the ceramic cylinder tube 10. The outer electrode 30 may be fitted with the outer wall portion 15 of the ceramic cylinder tube 10. When a tube-like electrode is used as the inner electrode 20, the electrode layer of the inner electrode 20 extends in the circumferential direction of the ceramic cylinder tube 10 and is surrounded by the ceramic cylinder tube 10. The electrode layer of the inner electrode 20 is provided radially inward relative to the inner wall portion 14 of the ceramic cylinder tube 10. The inner electrode 20 may be fitted with the inner wall portion 14 of the ceramic cylinder tube 10.

The tube-like electrode may be formed across the entire region of the inner surface 16 of the inner wall 14 of the ceramic cylinder tube 10 or may be formed across the entire region of the outer surface 17 of the outer wall 15 of the ceramic cylinder tube 10, not necessarily limited to through. Resistance of the tube-like electrode itself may be decreased, and good electrical connection between the tube-like electrode and the ceramic cylinder tube 10 would be facilitated.

FIG. 5 is a schematic view illustrating an embodiment in which an intermediate layer 39 is interposed between the outer electrode 30 and the ceramic cylinder tube 10. An embodiment is envisaged in which an intermediate layer 39 is interposed between the inner electrode 20 and the ceramic cylinder tube 10 and/or an intermediate layer 39 is interposed between the outer electrode 30 and the ceramic cylinder tube 10. The intermediate layer 39 may be made of conductive material, and facilitates good electrical connection or mechanical connection between the ceramic cylinder tube 10 and the electrode. For example, the intermediate layer 39 may include one or more material selected from a group consisting of iron (Fe), chromium (Cr), nickel (Ni), copper (Cu), aluminum (Al), molybdenum (Mo), and carbon (C). The intermediate layer 39 may be conductive slurry, conductive powder, or conductive paste in some embodiments, and may be coated onto the inner circumference surface or outer circumferential surface of the ceramic cylinder tube 10. The intermediate layer 39 may become a hard layer after being heat-processed (or fired) if so required. The thickness of the intermediate layer 39 may be within a range between 0.05 to 2 mm.

FIG. 6 is a schematic view illustrating an embodiment in which grooves 38 extending along the axial direction of the ceramic cylinder tube 10 are formed at the inner circumferential surface of an outer electrode 30. FIG. 7 is a schematic view illustrating an embodiment in which grooves 38 extending along the axial direction of the ceramic cylinder tube 10 are formed at the outer circumferential surface of the outer electrode 30. In both instances of FIGS. 6 and 7, a tube-like electrode is used as the outer electrode 30. As such, in some embodiments, the tube-like electrode used as the inner electrode 20 or the outer electrode 30 is provided with grooves 38 which are arranged in the circumferential direction, facilitating the tube-like electrode to be fitted with the ceramic cylinder tube 10.

In an instance where the outer electrode 30 of the tube-like electrode is fitted with the ceramic cylinder tube 10, a pressure may be applied from the outer electrode 30 to the ceramic cylinder tube 10. Accordingly, more sufficient fixing of the outer electrode 30 to the ceramic cylinder tube 10 would be facilitated, and better electrical connection or mechanical connection between the ceramic cylinder tube 10 and the outer electrode 30 would be facilitated. This holds true for an instance where the intermediate layer 39 is interposed between the ceramic cylinder tube 10 and the outer electrode 30. The above-described pressure may be obtained by shrink-fitting of the outer electrode 30 to the ceramic cylinder tube 10. The outer electrode 30 may be heated so that its opening diameter is increased, and the ceramic cylinder tube 10 is inserted or pressed into the outer electrode 30. Along with cooling of the outer electrode 30, the opening diameter of the outer electrode 30 would be smaller, thereby causing the pressure application from the outer electrode 30 to the ceramic cylinder tube 10.

In an instance in which the inner electrode 20 of the tube-like electrode is fitted with the ceramic cylinder tube 10, a pressure may be applied from the inner electrode 20 to the ceramic cylinder tube 10. Accordingly, more sufficient fixing of the inner electrode 20 to the ceramic cylinder tube 10 would be facilitated, and better electrical connection or mechanical connection between the ceramic cylinder tube 10 and the inner electrode 20 would be facilitated. This holds true for an instance where the intermediate layer 39 is interposed between the ceramic cylinder tube 10 and the inner electrode 20. The above-described pressure may be obtained by cool-fitting or press-fitting of the inner electrode 20 to the ceramic cylinder tube 10. The inner electrode 20 may be cooled so that its outer diameter is reduced, and the inner electrode 20 can be inserted or pressed into the tube hole H10 of the ceramic cylinder tube 10. Along with increase in temperature of the inner electrode 20, the outer diameter of the inner electrode 20 would be increased, thereby causing the pressure application from the inner electrode 20 to the ceramic cylinder tube 10.

With respect to the relationship between the inner diameter R1 and the outer diameter R2 of the ceramic cylinder tube 10, $0.3<(R1/R2)$ may be satisfied, or more preferably $0.6<(R1/R2)$ may be satisfied. Smaller the inner diameter would be, greater a change of ratio of (amount of generated heat/thermal capacity) in the radial direction, resulting in greater temperature difference. Satisfying $0.3<(R1/R2)$ or $0.6<(R1/R2)$ would allow suppression of increase of backpressure. In some embodiments, $0.3<(R1/R2)<0.9$ is satisfied, and more preferably $0.6<(R1/R2)<0.8$ is satisfied.

FIG. 8 is a schematic view showing an embodiment in which radially innermost cell array and radially outermost cell array in FIG. 3 are buried. The radially outermost cells OP10 and the radially innermost cells OP10 are buried, and the thicknesses of the inner wall portion 14 and the outer wall portion 15 are increased. Mechanical strength of the ceramic cylinder tube 10 is thus enhanced. Note that the respective thicknesses of the inner wall portion 14 and the outer wall portion 15 are regularly changed in the circumferential direction of the ceramic cylinder tube 10.

FIG. 9 is a schematic view showing an embodiment in which a round surface 80 is provided at at least one corner of cell OP10. At least one or each corner of cell OP10 is provided with a round surface 80. In other words, the cell OP10 is shaped so that a round surface 80 is formed at the corner of cell OP10. Accordingly, stress concentration at the corner of cell OP10 is avoided, or mechanical strength of the ceramic cylinder tube 10 is increased.

FIG. 10 is a schematic view showing an embodiment in which opening shape of cell OP10 is rectangular. The non-linear portion 13 extends in the radial direction of the ceramic cylinder tube 10 while having a plurality of bends or curves between the inner wall portion 14 and outer wall portion 15 of the ceramic cylinder tube 10. The number of bends of the non-linear portion 13=8, and the number of cell array=5. The non-linear portion 13 provides a current path that extends while having a plurality of bends or curves between the inner electrode 20 and the outer electrode 30, facilitating that greater amount of heat is generated. The inner electrode 20 and the outer electrode 30 allows that radial current path is formed in the ceramic cylinder tube 10. Accordingly, it is facilitated that sufficient amount of heat is obtained in the ceramic cylinder tube 10 in a manner that greater temperature gradient is suppressed at the time of energizing of the ceramic cylinder tube 10.

FIGS. 11-16 are schematic views showing variations of opening shapes and arrangements of cells OP10. An embodiment is envisioned that, as illustrated in FIG. 11, the cell OP10 have a shape elongated in the circumferential direction of the ceramic cylinder tube 10. An embodiment is envisioned, as illustrated in FIG. 12, the cells OP10 have a diamond opening shape except for the radially innermost or radially outermost cells OP10. The radially innermost or radially outermost cells OP10 have a triangular opening shape. An embodiment is envisaged in which the radially innermost or radially outermost cells OP10 are buried in accordance with increase of thickness of the inner wall portion 14 or the outer wall portion 15.

As illustrated in FIG. 13, an embodiment is envisioned in which the ceramic cylinder tube 10 has cells OP10 of a circular opening shape. As described above, the manner of bends or curves of the non-linear portion 13 is in accordance with the opening shape of cell OP10, and should not be limited to a manner in which the non-linear portion 13 is bent at a predetermined angle. The non-linear portion 13 provides a current path that extends while having a plurality of bends or curves between the inner electrode 20 and the outer electrode 30, facilitating that greater amount of heat is generated. The inner electrode 20 and the outer electrode 30 allows that radial current path is formed in the ceramic cylinder tube 10. Accordingly, it is facilitated that sufficient amount of heat is obtained in the ceramic cylinder tube 10 in a manner that greater temperature gradient is suppressed at the time of energizing of the ceramic cylinder tube 10.

It is also envisaged that cells OP10 have different opening shapes in a single ceramic cylinder tube 10. In an embodiment illustrated in FIG. 14, the ceramic cylinder tube 10 has cells OP10 of circular opening shape and cells OP10 of oval opening shape. In an embodiment illustrated in FIG. 15, the ceramic cylinder tube 10 has cells OP10 of circular opening shape and cells OP10 of rectangular opening shape. In an embodiment illustrated in FIG. 16, the ceramic cylinder tube 10 has cells OP10 of circular opening shape, cells OP10 of diamond opening shape, and cells OP10 of hexagonal opening shape.

The non-linear portion 13 provides a current path that extends while having a plurality of bends or curves between the inner electrode 20 and the outer electrode 30, facilitating that greater amount of heat is generated. The inner electrode 20 and the outer electrode 30 allows that radial current path is formed in the ceramic cylinder tube 10. Accordingly, it is facilitated that sufficient amount of heat is obtained in the ceramic cylinder tube 10 in a manner that greater temperature gradient is suppressed at the time of energizing of the ceramic cylinder tube 10.

Working Example 1

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 3, and hexagonal cells were radially arranged. Simulation was performed using software. As conditions of simulation, voltage 45V was applied for one second to the ceramic cylinder tube between the inner electrode and the outer electrode.

Working Example 2

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 11. Simulation was performed using software. As conditions of simulation, voltage 45V was applied for one second to the ceramic cylinder tube between the inner electrode and the outer electrode.

Working Example 3

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 13. Simulation was performed using software. As conditions of simulation, voltage 45V was applied for one second to the ceramic cylinder tube between the inner electrode and the outer electrode.

Comparative Example 1

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 17. Simulation was performed using software. As conditions of simulation, voltage 45V was applied for one second to the ceramic cylinder tube between the inner electrode and the outer electrode.

Comparative Example 2

A first outer circumferential electrode 101 and second outer circumferential electrode 102 were fixed to a ceramic cylinder body 100 having an outer diameter of 100 mm, and axial length of 46 mm. The first outer circumferential electrode 101 and the second outer circumferential electrode 102 were provided to sandwich the ceramic cylinder body 100. The ceramic cylinder body was made of porous Si-coupled SiC. Each of the outer circumferential electrode was an arc-like electrode and was made of stainless steel. Arrangement of cells in the ceramic cylinder body was as illustrated in FIG. 18. Simulation was performed using software. As conditions of simulation, voltage 45V was applied for one second to the ceramic cylinder tube between the first outer circumferential electrode and the second outer circumferential electrode.

Differences of maximum temperature and minimum temperature caused in the ceramic cylinder tube or body were determined for the respective ones of the working examples and comparative examples. The result is as shown in Chart 1.

CHART 1

|  | Arrangement of cells | Arrangement of electrodes | Temperature gradient |
|---|---|---|---|
| Working example 1 | FIG. 3 | FIG. 2 | 30° C. |
| Working example 2 | FIG. 11 | FIG. 2 | 38° C. |
| Working example 3 | FIG. 12 | FIG. 2 | 35° C. |
| Comparative example1 | FIG. 17 | FIG. 2 | 144° C. |
| Comparative example2 | FIG. 18 | FIG. 18 | 775° C. |

In the comparative example 1, as balancing between an amount of generated heat and thermal capacitances are not equalized, and therefore temperature gradient is caused even through electrodes are arranged at inner and outer sides. In the comparative example 2, in accordance with the start of energizing, current path is formed in a portion of the ceramic cylinder body 100 between the first outer circumferential electrode 101 and the second outer circumferential electrode 102. Joule heat would be generated in this current path, and heat transmission would be caused to the cells or cell-walls thermally coupled to the current path. In an instance in which the ceramic cylinder body 100 is heated up to a target temperature within a short period of time, Joule heat is dominant over thermal transmission, and thus causing great temperature gradient in cross-section of the ceramic cylinder body 100 (See Chart 1).

Given the above disclosure, a skilled person in the art would be able to add various modifications to the respective embodiments.

What is claimed is:

1. A heater comprising:
A conductive ceramic cylinder tube comprising an inner wall portion, an outer wall portion and cell-arrays interposed between the inner wall portion and the outer-wall portion, said cell-arrays concentrically arranged, each cell-array including cells arranged in a circumferential direction of the ceramic cylinder tube;
an inner electrode electrically coupled to the inner wall portion of the ceramic cylinder tube; and
an outer electrode electrically coupled to the outer wall portion of the ceramic cylinder tube, wherein
the cells in the cell-arrays form non-linear portions that are radially arranged in the ceramic cylinder tube, each non-linear portion extending in a radial direction of the ceramic cylinder tube while having a plurality of bends or curves between the inner wall portion and the outer wall portion of the ceramic cylinder tube, and
the inner and outer electrodes are provided such that current flows radially at least via said non-linear portions between the inner and outer electrodes, and wherein
the inner electrode and the outer electrode are tube-like electrodes.

2. The heater of claim 1, wherein the non-linear portion includes a plurality of first cell-walls that extend in a radial direction of the ceramic cylinder tube, and the plurality of first cell-walls are arranged alternately between adjacent radial lines that extend in the radial direction of the ceramic cylinder tube.

3. The heater of claim 2, wherein the non-linear portion includes a plurality of second cell-walls that extend so as to cross the radial line, and adjacent first cell-walls on the same radial line are coupled via one first cell-wall on an adjacent radial line and two second cell-walls.

4. The heater of claim 1, wherein at least one cell has a generally polygonal opening shape.

5. The heater of claim 4, wherein a round surface is formed at at least one or each corner of the at least one cell having a generally polygonal opening shape.

6. The heater of claim 1, wherein the number of bends or curves of the non-linear portion is greater than the number of cell-arrays.

7. The heater of claim 1, wherein the tube-like electrode is formed across an entire region of an inner surface of the inner wall portion of the ceramic cylinder tube or is formed across an entire region of an outer surface of the outer wall portion of the ceramic cylinder tube.

8. The heater of claim 1, wherein the tube-like electrode is provided with grooves that are arranged along a circumferential direction of the tube-like electrode.

9. The heater of claim 1, wherein $0.3<(R1/R2)$ is satisfied, where R1 represents an inner diameter of the ceramic cylinder tube, and R2 represents an outer diameter of the ceramic cylinder tube.

10. The heater of claim 1, wherein $0.6<(R1/R2)$ is satisfied, where R1 represents an inner diameter of the ceramic cylinder tube, and R2 represents an outer diameter of the ceramic cylinder tube.

11. A system comprising:
a flow passage in which an exhaust gas flows;
a heater of claim 1;
an exhaust gas purification apparatus provided downstream of the heater in a flow direction of the exhaust gas in the flow passage;
a switching unit that switches between first and second flow channels, the first flow channel being provided by the cells of the ceramic cylinder tube included in the heater, and the second flow channel being provided by a tube hole that is surrounded by the cells of the ceramic cylinder tube.

12. The heater of claim 1, wherein the cells in the cell-arrays include hexagonal cells.

13. The heater of claim 12, wherein each of the non-linear portions has a plurality of bends in accordance with the hexagonal cells.

14. The heater of claim 1, wherein the inner electrode is a cylindrical tube that is open throughout the entire axial length of the heater.

15. A method of manufacturing a heater, comprising:
producing, based on extrusion molding, a conductive ceramic cylinder tube comprising an inner wall portion, an outer wall portion and cell-arrays interposed between the inner wall portion and the outer wall portion, the cell-arrays concentrically arranged, each cell-array including cells arranged in a circumferential direction of the ceramic cylinder tube;
fixing an inner electrode to the inner wall portion of the ceramic cylinder tube; and
fixing an outer electrode to the outer wall portion of the ceramic cylinder tube, wherein
the cells in the cell-arrays form non-linear portions that are radially arranged in the ceramic cylinder tube, each non-linear portion extending in a radial direction of the ceramic cylinder tube while having a plurality of bends or curves between the inner wall portion and the outer wall portion of the ceramic cylinder tube, the inner and outer electrodes are provided such that current flows radially at least via said non-linear portions between the inner and outer electrodes, and the inner electrode and the outer electrode are tube-like electrodes.

16. The method of claim 15, wherein said fixing an inner electrode to the ceramic cylinder tube comprises cooling or pressing the inner electrode to be fitted into the ceramic cylinder tube.

17. The method of claim 15, wherein said fixing an outer electrode to the ceramic cylinder tube comprises heating the outer electrode to be fitted to the ceramic cylinder tube.

18. The method of claim 15, wherein an intermediate layer is provided between the ceramic cylinder tube and the inner electrode.

19. The method of claim 15, wherein an intermediate layer is provided between the ceramic cylinder tube and the outer electrode.

* * * * *